Sept. 2, 1952 O. C. HALL 2,609,456

ROTARY OUT-TRUNK SWITCHING ARRANGEMENT

Filed Aug. 9, 1950 3 Sheets-Sheet 1

INVENTOR
BY O. C. HALL
R. O. Covell
ATTORNEY

Sept. 2, 1952 O. C. HALL 2,609,456

ROTARY OUT-TRUNK SWITCHING ARRANGEMENT

Filed Aug. 9, 1950 3 Sheets-Sheet 2

INVENTOR
O. C. HALL
BY
R. O. Covell
ATTORNEY

Sept. 2, 1952 O. C. HALL 2,609,456

ROTARY OUT-TRUNK SWITCHING ARRANGEMENT

Filed Aug. 9, 1950 3 Sheets-Sheet 3

INVENTOR
O. C. HALL
BY R. O. Covell
ATTORNEY

Patented Sept. 2, 1952 2,609,456

UNITED STATES PATENT OFFICE 2,609,456

ROTARY OUT-TRUNK SWITCHING ARRANGEMENT

Oliver C. Hall, Fair Lawn, N. J., assignor to Bell Telephone Laboratories, Incorporated, New York, N. Y., a corporation of New York Application August 9, 1950, Serial No. 178,518

4 Claims. (Cl. 179—18)

Figures 1, 4:
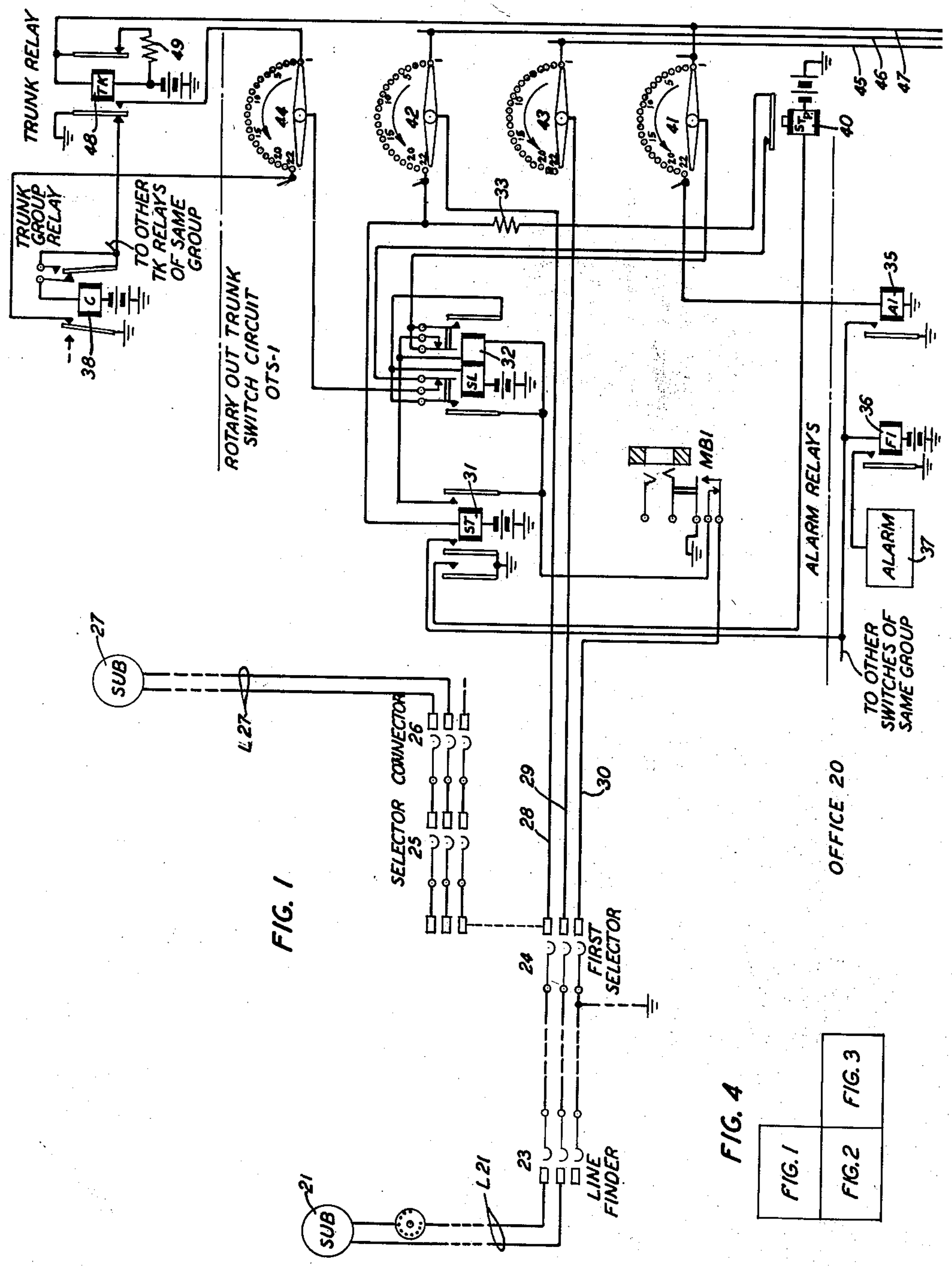

This invention relates to communication systems and particularly to switching systems employing non-numerical trunking switches.

Objects of the invention are the distribution of traffic from a number of small trunk groups over a single large group of trunks, the concentration of traffic from a large number of trunks to a smaller number of trunks and a more efficient and otherwise improved operation of non-numerical trunking switches.

This invention is a non-numerical trunking switch arranged to preselect an idle outgoing trunk, to make a selected outgoing trunk test busy to other trunking switches or other selectors having access thereto as soon as the trunking switch is seized by a preceding switch and to stop the trunk hunting operation when all outgoing trunks to which the switch has access become busy. A feature of the invention is the provision of a separate set of terminals in a preselecting outgoing trunking switch on which the brushes of the switch come to rest so as to bring in an alarm in case the switch trunk hunts continuously for a predetermined interval of time or in case the switch is seized while its brushes are in engagement with said set of terminals. Another feature is a preselecting outgoing trunking switch arranged to mark the trunk incoming to the switch so that this incoming trunk tests busy to all preceding switches having access thereto.

The invention and its features, including those mentioned, are embodied in the system shown schematically in the drawings. The invention is not, however, limited in its application to the particular system disclosed but is generally applicable to any system employing outgoing trunking switches.

Figure 2:
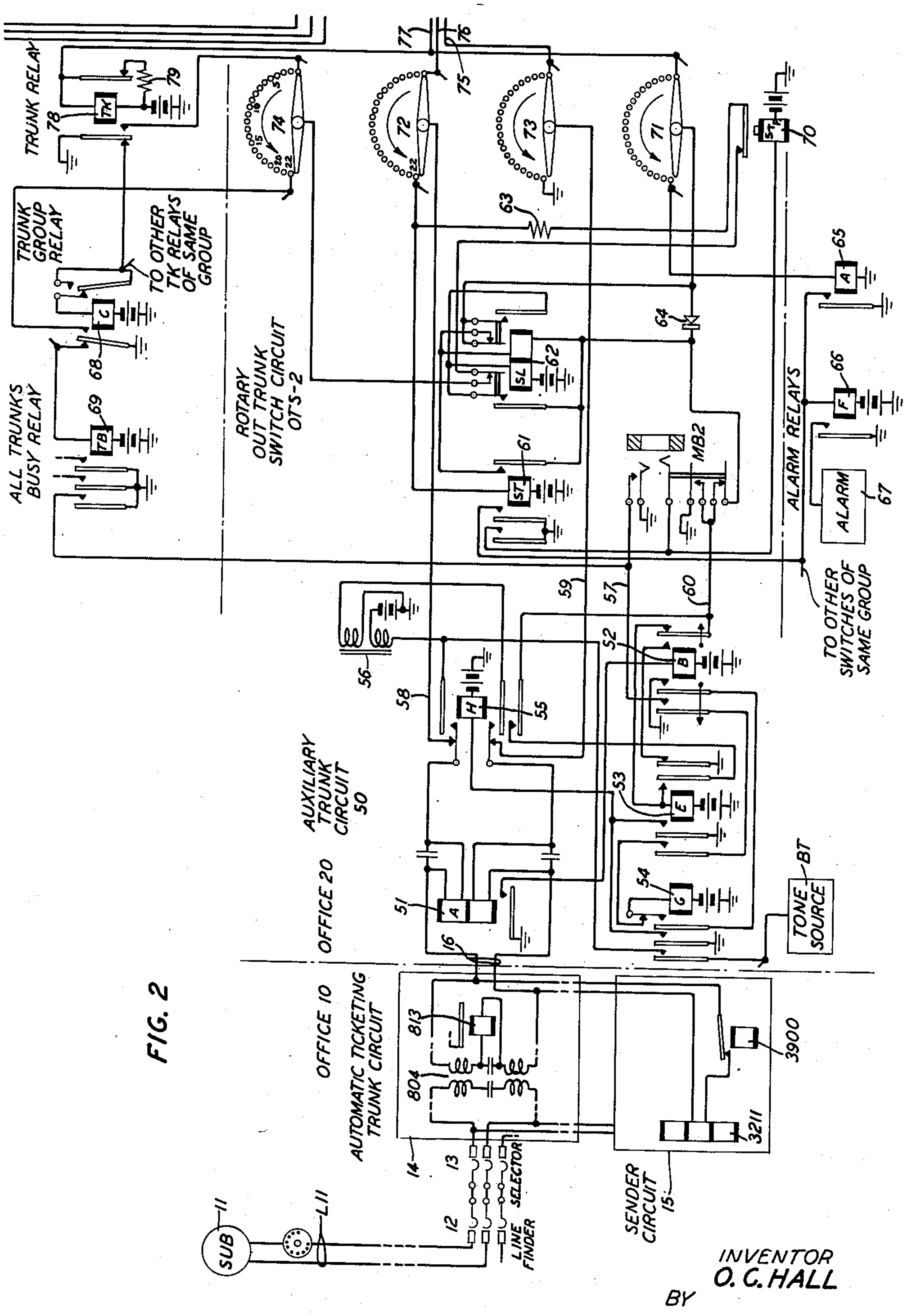
Figure 3:
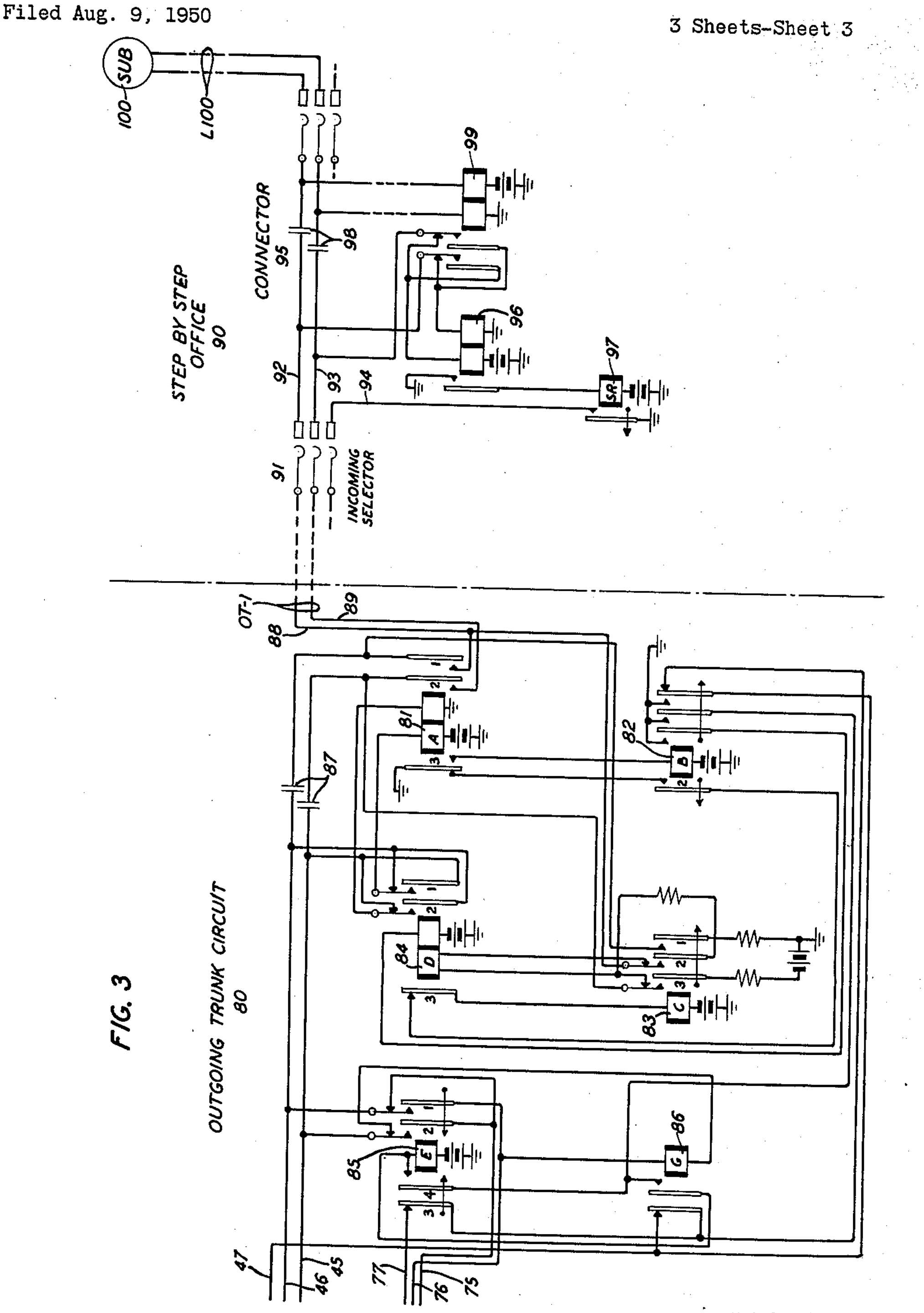

Referring to the drawing,

Fig. 1 shows in an automatic telephone office 20, line finder, selector and connector switches for establishing connections between calling and called subscriber lines, and a rotary out trunk switch OTS–1;

Fig. 2 shows in the automatic office 20, another rotary out trunk switch OTS–2 and an auxiliary trunk circuit 50; and shows in another automatic office 10, line finder and selector switches and automatic ticketing trunk and sender circuits;

Fig. 3 shows in the automatic office 20 an outgoing trunk circuit 80 associated with an outgoing trunk OT–1 leading to a step-by-step office 90; and shows in the step-by-step office 90 an incoming selector 91, a connector 95 and a subscriber's line L100; and Fig. 4 shows the relative position in which Figs. 1, 2 and 3 are to be placed to form an operative system.

The switching equipment in offices 10 and 20 may be any known type but is shown as being of the step-by-step type. The subscriber stations 11, 21, 27 and 100 are of known type including a dial for use in controlling selector and connector switches. Reference may be had to "Automatic Telephony" by Smith and Campbell, 2nd edition, published in 1921, pages 53 to 69 for a description of the structure of step-by-step switches and their operation when used as selectors and connectors. Reference may be had to Patent 1,799,654, granted April 7, 1931, to R. L. Stokely, for a description of the operation of such switches when used as line finders. The line finder switches 12 and 23, selector switches 13, 24, 25 and 91 and connector switch 26 are each represented by a set of brushes and one or two sets of terminals, all other associated equipment being omitted. The connector switch 95 is represented by a set of brushes and a single set of terminals; and the associated connector circuit apparatus is represented by line relay 96, release relay 97, condensers 98, and supervisory relay 99, all other apparatus being omitted. The automatic ticketing trunk circuit 14 is similar to the automatic ticketing trunk circuit disclosed in Figs. 2, 3 and 4 of Patent 2,447,533, granted August 24, 1948, to J. B. Retallack and also in Figs. 7, 8 and 9 of an application Serial No. 448,782, filed by J. W. Gooderham June 27, 1942; and the sender circuit 15 is similar to the sender circuit shown in Figs. 6 to 10 of the Retallack patent and in Figs. 30 to 43, inclusive, of said Gooderham application. The automatic ticketing trunk circuit 14 is represented by the repeating coil 804 and supervisory relay 813, and the sender circuit 15 is represented by relay 3211 and 3900, each of these elements having the same reference characters as the corresponding elements in the Gooderham specification. The rotary out-trunk switch circuits OTS–1 and OTS–2, the auxiliary trunk circuit 50 and the outgoing trunk circuit 80 are shown in detail and the operation of each is fully set forth herein.

The rotary out-trunk switch circuit OTS–1 comprises a 22-point rotary switch having a stepping magnet 40, brushes and terminal banks 41, 42, 43 and 44, a stepping relay 31 and a sleeve relay 32. The rotary out-trunk circuit OTS–2 comprises a 22-point rotary switch having a stepping magnet 70, brushes and terminal banks 71, 72, 73 and 74, a stepping relay 61 and a sleeve relay 62. Reference may be had to Patent 1,472,-465 granted October 30, 1923, to O. F. Forsberg et al. for a description of the structure of these switches. Outgoing trunks are connected to terminals of terminal sets 1 to 21 of each switch and terminal set 22 is used for stopping the rotation of the brushes in case all of the outgoing trunks are busy. Each of switches OTS–1 and OTS–2 represents a group of similar switches having access to a common group of trunks outgoing from office 20 to the step-by-step office 90. This group of trunks is represented by trunk OT–1, which terminates in an incoming selector circuit 91 in office 90. In the office 20, each trunk of the group leading to office 90 is connected to an outgoing trunk circuit similar to the trunk circuit 80 to which trunk OT–1 is individually connected, this trunk circuit being arranged to repeat selective impulses over the trunk to control the operation of the switches in office 90. As illustrated, the trunk circuit 80 is connected by conductors 45, 46 and 47 to the first set of terminals in the bank of a group of out-trunk switches including the switch OTS–1, each of which is directly connected to a set of terminals in the bank of a selector switch in office 20; and the trunk circuit 80 is also connected by conductors 75, 76 and 77 to the first set of terminals in the banks of another group of switches including the switch OTS–2, each of which is connected to an auxiliary trunk circuit such as 50 and which is, in turn, connected by a trunk 16 to an automatic ticketing trunk circuit 14 in office 10. This arrangement makes the single group of trunks from office 20 to office 90 available for use in completing calls originating in both offices 10 and 20. The system may require other groups of out-trunk switches and the trunking arrangement may be one in which all of the out-trunk switches in a group are connected directly to outgoing trunks; and may be one in which all of the out-trunk switches in a group are directly connected to terminals in the banks of selectors, or are directly connected to automatic ticketing trunk circuits, or are directly connected to auxiliary trunks which, in turn, are connected by inter-office trunks to automatic ticketing trunk circuits in another office.

Each rotary out-trunk switch is preselecting and stays in the position last used until the trunk connected to the terminals engaged by the brushes is seized by some other switch, whereupon any such switch is advanced, in the manner hereinafter described, until the brushes engage terminals connected to an idle trunk; or, in case all trunks are then busy, any such switch is advanced to position 22, in which position the brushes remain until a trunk becomes idle.

Each group of rotary out-trunk switches has associated therewith alarm relays, such as relays 35 and 36 shown in Fig. 1 and relays 65 and 66 shown in Fig. 2; individual trunk relays, such as relays 48 and 78 for each trunk which is multipled to the banks of the group of out-trunk switches; trunk group relays, such as relays 38 and 68; and one or more all-trunks-busy relays, such as relay 69. The function and operation of the alarm, trunk and trunk group relays are hereinafter described.

Assume first that each of switches OTS–1 and OTS–2 are idle, that the brushes of switch OTS–1 are in position 1 and that the brushes of switch OTS–2 are in any position other than position 22. Assume further that a call is originated at station 21, that the line L21 is thereupon connected by a line finder switch 23 to a first selector switch 24 and that the selector 24 is operated under the control of dial impulses from the calling station to make a group selection and then automatically to select the set of terminals to which conductors 28, 29 and 30 are connected. Upon selection of this set of terminals, ground potential is connected through the test brush of selector 24 to conductor 30 causing the energization of the right winding of sleeve relay 32 and the energization of the winding of the trunk relay 48 associated with the outgoing trunk circuit 80. Relay 32 operates and locks through its left winding and left front contact to the grounded conductor 30 before relay 48 operates to open the shunt circuit through resistor 49. The operation of relay 32 opens the connection between the winding of stepping relay 31 and the test brush 44 to prevent stepping of the brushes. The operation of relay 48 connects ground to terminal 1 of each switch in the group, thereby to effect the operation of the stepping relay of any other out-trunk switch in the same group which happens at that time to have its brushes in engagement with terminals 1, and to guard against seizure of the out-trunk circuit 80 by any other of the switches which may trunk hunt while trunk circuit 80 is busy on the call incoming through switch OTS–1. The connection from the calling line to conductors 28 and 29 is extended through brushes 42 and 43, conductors 45 and 46 and right back contacts of relay 84 of outgoing trunk circuit 80 to the windings of relay 81, thereby operating relay 81. The operation of relay 81 closes a circuit for operating the slow-to-release relay 82; and relay 82 connects ground to sleeve conductor 47 to maintain the energization of relay 48. The ground thus connected to conductor 47 is further connected through brush 41 and the right front contact of relay 32 to the left winding of relay 32 to hold relay 32 operated after the momentary ground in the selector circuit 24 is disconnected from sleeve conductor 30; and this ground is further connected through the left front contact of relay 32 and a normally closed contact of jack MB1 to conductor 30 to hold the connection established through switches 23 and 24 between line L21 and switch OTS–1. The ground connected to sleeve conductor 47 is further connected through back contacts of relays 86 and 85 and sleeve conductor 77 to terminal 1 of each of the out-trunk switches in the group including switch OTS–2, thereby operating trunk relay 78. The operation of relay 78 connects ground to terminal 1 of bank 74 of each switch in the group including switch OTS–2; so that the stepping relay and stepping magnet of any switch standing in position 1 is operated to effect the advance of such a switch to hunt for an idle set of terminals; and so that none of these switches will stop in position 1 while trunk circuit 80 is busy on the call through switch OTS–1. The operation of relay 82 closes a circuit for energizing the biasing winding of supervisory relay 84. The aforementioned operation of relay 81 closes a bridge across conductors 88 and 89 of trunk OT–1, to operate the line relay (not shown) of incoming selector 91. This bridge is traced from conductor 88 through a normally closed contact of relay 83, left winding of relay 84, another normally closed contact of relay 83 and inner right front contact of relay 81, to conductor 89. The current through the left winding of relay 84 is at this time in the non-operating direction so that relay 84 does not operate. When the calling subscriber dials the next digit of the called subscriber's directory number, relay 81 is alternately released and reoperated responsive to each impulse in the train of pulses created by the pulsing contacts of the dial. The release of relay 81 at the beginning of the first pulse closes a circuit for operating relay 83. Being slow to release, relay 82 remains operated during the transmission of dial pulses; and since relay 83 is slow to release, it remains operated until all of the pulses in a digit train have been transmitted. Each time relay 81 releases, it cause the release of the line relay (not shown) of selector 91; and each time relay 81 reoperates, battery and ground are connected through front contacts of relay 83 and front contacts of relay 81 to conductors 88 and 89, respectively, to effect the reoperation of the line relay of selector 91. At the end of the pulse train, relay 81 remains operated long enough to cause the release of relay 83, whereby the left winding of relay 84 is again bridged across conductors 88 and 89. The selector 91 selects a trunk to an idle connector, whereby the line relay 96 is operated in series with the left winding of relay 84. The operation of relay 96 causes the operation of slow-to-release relay 97; and relay 97 connects ground to conductor 94 to hold the connection established through selector 91, in usual manner. The trains of pulses created by the dialing of the remaining digits of the called subscriber's directory number are transmitted by relay 81 over trunk OT-1 to line relay 96, whereby the connector is operated to extend the connection to the called line L100. The called station is signaled by means not shown; and, when the call is answered, relay 99 operates, thereby effecting a reversal of current over the conductors of trunk OT-1 and operation of relay 84. Relay 84 in turn interchanges the connection between conductors 45 and 46 and the windings of relay 81 to reverse the current in conductors 28 and 29. When the called subscriber replaces the telephone set at station 100, relay 99 releases; and when the calling subscriber replaces the telephone set at station 21, relay 81 releases. The release of relay 81 opens the bridge across conductors 88 and 89, to effect the release of relay 96. Relay 97 is thereby released to disconnect ground from conductor 94; and the selector 91 and connector 95 are thereupon restored to normal in usual manner. Relay 82 releases, following the release of relay 81, thereby disconnecting ground from conductors 47, 77 and 30, effecting the release of trunk relay 48, the release of sleeve relay 32, and the return of the selector 24 and line finder 23 to normal in usual manner. The release of relays 48 and 78 disconnects ground from terminal 1 of bank 44 of each of the switches in the groups including switches OTS-1 and OTS-2, thereby making the terminals to which trunk circuit 80 is connected selectable by any out-trunk switch of either group.

In case the brushes of switch OTS-1 are in position 1 at the time that trunk circuit 80 is seized on a call through some other switch in the group, the connection of ground to conductor 47 in the manner above described causes the operation of trunk relay 48. The operation of relay 48 closes a circuit from ground through the front contact of relay 48, terminal 1 and brush 44, left back contact of relay 32, back contact of stepping magnet 40, resistor 33 and winding of stepping relay 31. Relay 31 operates, closing a circuit for operating stepping magnet 40. The operation of stepping magnet 40 causes the release of relay 31, and the release of relay 31 causes the release of stepping magnet 40 thereby advancing the brushes to the next set of terminals. If the trunk to which this next set of terminals connects is also busy, the trunk relay similar to relay 48 is operated and stepping relay 31 is reoperated to effect the reoperation of stepping magnet 40 and advance of the brushes another step. This action, is repeated until the brushes engage a set of terminals connected to an idle one of the trunks, to which switch OTS-1 has access. The switch does not stop in position 22 if any of these trunks is idle because terminal 22 of bank 44 is connected to ground at a front contact of normally operated group relay 38. In case all trunks to which switch OTS-1 has access are busy, all of the trunk relays such as relay 48 are operated, causing the release of group relay 38; and in this case, ground is disconnected from terminal 22 of bank 44 and the brushes are advanced to and remain in position 22. When a trunk becomes idle, the associated trunk relay releases, thereby causing the reoperation of group relay 38, the operation of stepping relay 31 and stepping magnet 40 and the advance of the brushes to the idle set of terminals.

Assume next that a call is initiated at a station 11 in office 10, that the line L11 is extended by a line finder 12 to a first selector 13 and, under the control of the dial at station 11, to an automatic ticketing trunk 14 and sender 15. Reference may be had to the aforementioned patent to J. B. Retallack and application of J. W. Gooderham for a detailed description of the operation of the automatic ticketing trunk and sender circuits. When the sender 15 is connected to the automatic ticketing trunk 14, the sender connects the middle winding of relay 3211 across the conductors of trunk 16; and, assuming that the brushes of out-trunk switch OTS-2 are in position 1, relay 51 of auxiliary trunk circuit AT and relay 81 of outgoing trunk circuit 80 are operated in the pulsing circuit which is further traced from the conductors of trunk 16, windings of relay 51, back contacts of relay 55, conductors 58 and 59, brushes 72 and 73, conductors 76 and 75, winding of relay 86 of outgoing trunk circuit 80, back contacts of relay 85, back contacts of relay 84 and the windings of relay 81. The current in this circuit causes the operation of relay 3211 in sender circuit 15 and also relays 51, 86 and 81. The operation of relay 51 closes a circuit for operating slow-to-release relay 52; and the operation of relay 52 closes a circuit from ground at the back contact of relay 53, through the right front contact of relay 52, sleeve conductor 60, back contact of jack MB2, right winding and back contact of relay 62, brush 71, conductor 77, back contact and winding of relay 78, to battery. Relay 62 operates and closes a holding circuit through its left winding before relay 78 operates and opens the shunt circuit through resistor 79. The operation of relay 62 opens the connection between the winding of stepping relay 61 and brush 74 to prevent stepping of the brushes. The operation of relay 78 connects ground to terminal 1 of bank 74 of each switch in the same group, thereby to effect the operation of the stepping relay of any other out-trunk switch in the group which happens at that time to have its brushes in position 1 and also to guard against seizure of the outgoing trunk circuit 80 by any other of the out-trunk switches which may trunk hunt while trunk circuit 80 is busy on the call incoming through switch OTS-2. The aforementioned operation of relay 81 closes a circuit for operating relay 82; and relay 82 connects ground to conductor 47 to operate trunk relay 48 to cause trunk hunting by each switch in the group including switch OTS-1 having its brushes in position 1 at the time relay 82 of trunk circuit 80 is operated. With relay 86 operated, the operation of relay 82 does not connect ground to conductor 77; but relay 78 is held operated in series with the right winding of relay 62, through conductor 60 and a front contact of relay 52 to ground at the back contact of relay 53 of the auxiliary trunk circuit 50. The ground connected to conductor 47 is further connected to terminal 1 of bank 41 of each of the other out-trunk switches in the same group but without effect since none of these other switches will stop in position 1 while relay 48 is operated. The operation of relay 82 closes a circuit for energizing the biasing winding of supervisory relay 84, and closes a circuit including the front contact of relay 86 for operating relay 85. Relay 85 locks under the direct control of relay 82, opens the circuit through the winding of relay 86 and interchanges the connections between conductors 76 and 75 and the windings of relay 81 to reverse the current in the pulsing circuit and thereby cause the release of relay 3211 in sender circuit 15. Relay 86 releases but, with relay 85 operated, the ground connected by relay 82 to conductor 47 is not connected to conductor 77. The release of relay 3211 of sender circuit 15 causes the sender to transmit trains of pulses to relay 81 and these pulses are repeated by relay 81 over trunk OT-1 to effect the completion of the desired connection in office 90.

When the telephone is restored to normal at station 11, the automatic ticketing trunk circuit 14 opens the repeating coil bridge across the conductors of trunk 16 and the trunk circuit 14, selector 13 and line finder 12 are restored to normal. The opening of the bridge across the conductors of trunk 16 causes the release of relays 51 and 81. The release of relay 51 causes the release of relay 52; and the release of relay 81 causes the release of relays 82 and 85 in succession and causes the release of relays 96 and 97 in succession. The release of relay 82 disconnects ground potential from conductor 47 releasing relay 48, and the release of relay 97 disconnects ground from conductor 94, the incoming selector 91 and connector 95 being restored to normal in usual manner. The aforementioned release of relay 52 transfers sleeve conductor 60 from ground at the back contact of relay 53 to the winding of relay 53, thereby causing the release of relays 62 and 78. The release of relays 48 and 78 disconnects ground potential from terminal 1 of banks 44 and 74; and the brushes of switches OTS-1 and OTS-2 remain in position 1 until trunk circuit 80 is seized by some other switch in the groups including switches OTS-1 and OTS-2.

If the trunk circuit 80 is seized by some switch in the group including switch OTS-1 while the brushes of switch OTS-2 are in position 1, the operation of trunk relay 78, due to the connection of ground to conductor 77, causes the operation of stepping relay 61; and the brushes of switch OTS-2 are thereby advanced to hunt for an idle trunk. In this case, the connection of ground to conductor 77 is also effective to cause the operation of relay 53 of auxiliary trunk circuit 50; but relay 62 is not operated in series with relay 53 since its right winding is shunted by rectifier 64. The operation of relay 53 closes a circuit for operating relay 55. The operation of relay 55 closes a locking circuit for relay 53 to sleeve conductor 60, independent of relay 52; disconnects conductors 58 and 59 from the windings of relay 51; and connects battery and ground through the windings of retard coil 56 to the windings of relay 51. Thus the automatic ticketing trunk circuit 14 may be seized while out-trunk switch OTS-2 is hunting for an idle trunk, but the connections between trunk 16 and brushes 72 and 73 of switch OTS-2 are open until an idle trunk is found. In case trunk circuit 14 is seized while switch OTS-2 is trunk hunting and relays 53 and 55 are operated, relays 51 and 52 are operated in succession. If there is an idle trunk when relay 52 operates, relay 53 releases as soon as the brushes of switch OTS-2 engage the idle set of terminals; whereupon the release of relay 53 causes the release of relay 55 thereby connecting trunk 16 through conductors 58 and 59 and brushes 72 and 73 to the idle trunk circuit. If all trunks to which switch OTS-2 has access are busy, all trunk relays such as 78 are operated and relay 68 releases. The release of relay 68 closes a circuit for operating relay 69 and disconnects ground from terminal 22 of bank 74 of each switch in the group, so that all idle switches in the group are advanced to and stop in position 22. If relay 69 is operated while switch OTS-2 is hunting and relays 53 and 52 are operated as above described, a circuit is closed through conductor 57 for operating relay 54. Relay 54 locks under the sole control of relay 52, closes a connection for holding relay 55 operated independent of relay 53, and connects busy tone source BT to one winding of retard coil 56 thereby transmitting trunks-busy tone to the calling station.

If the trunk circuit 80 is seized by some other switch in the group including switch OTS-2 while the brushes of switch OTS-2 are standing in position 1, relay 78 is operated (in the manner above described when switch OTS-2 is seized); and the operation of relay 78 connects ground to terminal 1 of bank 74 to operate stepping relay 61 and thereby effect the advance of the brushes to the next set of terminals, the operation of stepping relay 61 being repeated until an idle set of terminals is encountered.

If the tip and ring conductors 28 and 29, leading to brushes 42 and 43 of switch OTS-1, should become short-circuited or if ring conductor 28 should become grounded while the switch is engaging an idle set of terminals, the outgoing trunk circuit, for instance trunk circuit 80, connects ground to sleeve conductor 47 operating trunk relay 48; and the operation of relay 48 causes the operation of the stepping relay 31 and stepping magnet 40 to advance the brushes, these operations being repeated until the brushes reach position 22. In this position, stepping relay 31 is held operated by the short-circuit or ground so that stepping magnet 40 is held operated and the brushes remain in position 22. When the trouble is cleared, relay 31 releases and the stepping magnet 40 then releases, advancing the brushes to hunt for an idle set of terminals. Each time the stepping relay 31, of any switch in the group including switch OTS-1, is operated, a circuit is closed for operating the common alarm relay 36; and, if the stepping relay remains operated for a predetermined interval of time, due to a short-circuit on ground, as above mentioned, or because the selector trunk hunts continuously, or because of any other trouble condition, an alarm 37 is operated. In like manner, a short-circuit across conductors 58 and 59 leading to the brushes 72 and 73 of switch OTS-2 or a ground on conductor 58 will cause operation of the trunk relay such as relay 78 and advance of switch OTS-2 to position 22; and with stepping relay 61 held operated in position 22, an alarm relay 66 is operated and after a predetermined interval of time, an alarm 67 is operated. When the trouble is cleared, relay 61 releases and stepping magnet 70 releases, advancing the brushes to hunt for an idle set of terminals.

In case the sleeve relay 32 of switch OTS-1 or the sleeve relay 62 of switch OTS-2 should become operated for any reason while the brushes are in position 22, the release of relay 48 or 68 when some trunk becomes idle could not cause the operation of stepping relay 31 or 61; and the switch or switches in question could not advance out of position 22. However, in this case, alarm relay 35 or alarm relay 65 is operated in series with the left winding of relay 32 or 62, thereby closing a circuit for operating alarm relay 36 or 66 to bring in an alarm after a predetermined interval. The sleeve relay 32 or 62 may then be released by manually opening the right front contacts of the relay so the stepping relay may operate when the trunk group relay releases.

What is claimed is:

1. In combination in a telephone system comprising a plurality of central offices each including switching means for completing conversational connections between calling and called subscriber stations, a plurality of rotary switches each comprising a plurality of wipers and sets of terminals and means for advancing the wipers from each set of terminals to the next, a group of outgoing trunks extending to one of said offices, each of said trunks connected to one of the sets of terminals in each of said rotary switches, auxiliary trunk circuits, one for each of said switches, incoming trunks, each of said incoming trunks connected to a different one of said auxiliary trunk circuits, relay means individual to each outgoing trunk operated when the trunk is busy, means individual to each of said switches for effecting the advance of the switch to the next set of terminals responsive to operation of said relay means associated with the trunk connected to the set of terminals engaged by the wipers of the switch when this trunk is seized through another of said switches, means in each of said trunk circuits normally connecting the associated incoming trunk to the wipers of the associated rotary switch and therethrough to one of said outgoing trunks, means associated with each outgoing trunk effective when an incoming trunk to which it is connected is seized for operating said relay means individual to said outgoing trunk, and means comprising relay means in the auxiliary trunk circuit associated with the seized incoming trunk rendered effective in case the rotary switch is being advanced at the time the incoming trunk is seized for opening the connection between sad incoming trunk and the wipers of the associated rotary switch.

2. In combination in a telephone system comprising a plurality of central offices each including switching means for completing conversational connections between calling and called subscriber stations, a plurality of rotary switches each comprising a plurality of wipers and sets of terminals and means for advancing the wipers from each set of terminals to the next, a group of outgoing trunks extending to one of said offices, each of said trunks connected to one of the sets of terminals in each of said rotary switches, auxiliary trunk circuits, one for each of said switches, incoming trunks, each of said incoming trunks connected to a different one of said auxiliary trunk circuits, relay means individual to each outgoing trunk operated when the trunk is busy, means individual to each of said switches for effecting the advance of the switch to the next set of terminals responsive to operation of said relay means associated with the trunk connected to the set of terminals engaged by the wipers of the switch when this trunk is seized through another of said switches, means in each of said trunk circuits normally connecting the associated incoming trunk to the wipers of the associated rotary switch and therethrough to one of said outgoing trunks, means associated with each outgoing trunk effective when an incoming trunk to which it is connected is seized for operating said relay means individual to said outgoing trunk, and means comprising relay means in the auxiliary trunk circuit associated with the seized incoming trunk rendered effective in case the rotary switch is being advanced at the time the incoming trunk is seized for opening the connection between said incoming trunk and the wipers of the associated rotary switch, and means including relay means associated with said group of outgoing trunks and relay means in the auxiliary trunk circuit associated with the seized incoming trunk rendered effective when all of the outgoing trunks are busy for holding open the connection between the incoming trunk and the wipers of the associated rotary switch until the incoming trunk is released.

3. In combination in a telephone system comprising a plurality of central offices each including switching means for completing conversational connections between calling and called subscriber stations, a plurality of rotary switches each comprising a plurality of wipers and sets of terminals and means for advancing the wipers from each set of terminals to the next, a group of outgoing trunks extending to one of said offices, each of said trunks connected to one of the sets of terminals in each of said rotary switches, auxiliary trunk circuits, one for each of said switches, incoming trunks, each of said incoming trunks connected to a different one of said auxiliary trunk circuits, relay means individual to each outgoing trunk operated when the trunk is busy, means individual to each of said switches for effecting the advance of the switch to the next set of terminals responsive to operation of said relay means associated with the trunk connected to the set of terminals engaged by the wipers of the switch when this trunk is seized through another of said switches, means in each of said trunk circuits normally connecting the associated incoming trunk to the wipers of the associated rotary switch and therethrough to one of said outgoing trunks, means associated with each outgoing trunk effective when an incoming trunk to which it is connected is seized for operating said relay means individual to said outgoing trunk, means comprising relay means in the auxiliary trunk circuit associated with the seized incoming trunk rendered effective in case the rotary switch is being advanced at the time the incoming trunk is seized for opening the connection between said incoming trunk and the wipers of the associated rotary switch, each of said rotary switches having one set of terminals to which no outgoing trunk is connected, and relay means effective to normally mark said one set of terminals as busy and effective when all of said outgoing trunks are busy to remove said busy marking thereby to prevent the further advance of the wipers as long as the all-busy condition continues to exist.

4. In a multioffice telephone system, subscriber lines, outgoing trunks, outgoing from one office, incoming trunks incoming to said one office, rotary switches, one for each incoming trunk, each of said outgoing trunks connected to a different set of terminals in the bank of each of said switches, means for connecting a calling one of said subscriber lines to an idle one of said incoming trunks, means associated with each incoming trunk effective when a calling subscriber's line is connected thereto and the wipers of the associated rotary switch are connected to an idle one of said outgoing trunks for marking said incoming trunk as busy, means in each switch effective when the wipers are engaging a busy outgoing trunk for causing the advance of the wipers to the next set of terminals, another set of terminals in the bank of each switch normally marked busy, and means for removing said busy marking from said other set of terminals when all of said outgoing trunks are busy.

OLIVER C. HALL.

REFERENCES CITED

The following references are of record in the file of this patent:

UNITED STATES PATENTS

| Number | Name | Date |
|---|---|---|
| 1,681,034 | Gardner | Aug. 14, 1928 |